US011823085B2

(12) United States Patent
Tan et al.

(10) Patent No.: US 11,823,085 B2
(45) Date of Patent: Nov. 21, 2023

(54) SYSTEMS AND METHODS FOR A WORKFLOW TOLERANCE DESIGNER

(71) Applicant: Nintex USA, Inc., Bellevue, WA (US)

(72) Inventors: Joshua Joo Hou Tan, Newport (AU); Alain Marie Patrice Gentilhomme, Sammamish, WA (US)

(73) Assignee: Nintex USA, Inc., Bellevue, WA (US)

( * ) Notice: Subject to any disclaimer, the term of this patent is extended or adjusted under 35 U.S.C. 154(b) by 404 days.

(21) Appl. No.: 16/835,004

(22) Filed: Mar. 30, 2020

(65) Prior Publication Data

US 2020/0311629 A1  Oct. 1, 2020

Related U.S. Application Data

(60) Provisional application No. 62/826,618, filed on Mar. 29, 2019.

(51) Int. Cl.
*G06Q 10/0633* (2023.01)
*G06N 20/00* (2019.01)
*G06Q 10/10* (2023.01)

(52) U.S. Cl.
CPC ......... *G06Q 10/0633* (2013.01); *G06N 20/00* (2019.01); *G06Q 10/103* (2013.01)

(58) Field of Classification Search
CPC ........... G06Q 10/103; G06Q 10/06313; G06Q 10/105; G06Q 10/00; G06Q 10/06; G06Q 30/02; G06F 16/2379; G06F 16/252; H04L 63/08; H04L 51/34; H04L 51/04; H04L 12/1813
See application file for complete search history.

(56) References Cited

U.S. PATENT DOCUMENTS

| 10,324,783 | B1* | 6/2019 | Saha | G06Q 10/0633 |
| 2015/0332197 | A1* | 11/2015 | Sharma | G16H 50/20 |
| | | | | 705/2 |
| 2018/0157384 | A1* | 6/2018 | Baneva | G06F 9/451 |
| 2021/0019686 | A1* | 1/2021 | Kidd | G06Q 10/06311 |
| 2021/0063410 | A1* | 3/2021 | Wilcox | G01N 33/6848 |

OTHER PUBLICATIONS

Yildiz et al., Fault-Tolerance in Dataflow-Based Scientific Workflow Management, Jul. 1, 2010, 2010 6th World Congress on Services, pp. 336-343 (Year: 2010).*

* cited by examiner

*Primary Examiner* — Robert D Rines
(74) *Attorney, Agent, or Firm* — Perkins Coie LLP

(57) ABSTRACT

Disclosed here are systems and methods that allow users to create and customize workflow tolerances. The designed tolerances define and set guidelines, such as parameters, limitations, and tolerances, for the expected values of a workflow's input and output actions. The disclosed systems and methods, upon identifying values that fall out of determined guidelines, may: notify users of such values, trigger processes that pause or stop the workflow, and require user approval before resuming the paused/stopped workflow. Embodiments may comprise machine learning components that identify incorrect/irregular values without prior user designation. Such systems and methods improve communication technology between the networks and servers of separate parties relevant and/or dependent on successful execution of other workflows and processes; allowing for effective understanding, implementation, and engagement of workflows and processes across organizational boundaries.

16 Claims, 5 Drawing Sheets

SYSTEMS AND METHODS FOR A WORKFLOW TOLERANCE DESIGNER

CROSS-REFERENCE TO RELATED APPLICATION(S)

This application claims benefit to U.S. Provisional Application No. 62/826,618, filed on Mar. 29, 2019, entitled "Systems and Methods for a Workflow Tolerance Designer" the contents of which are incorporated by reference herein as though set forth in their entirety, and to which priority and benefit are claimed.

FIELD OF USE

The present disclosure relates generally to the field of customized workflow process technology. More specifically, the present disclosure relates to enhanced systems and methods that provide options for creating and designing workflow tolerances that regulate a workflow's input and output actions and trigger corresponding action processes.

BACKGROUND

Programmatic workflows are applications and systems that streamline and automate a wide variety of business processes. Workflow technology is enabling individuals and organizations across various industries to automate processes in a way that dramatically enhances productivity and efficiency. As a result, workflow technology is becoming more complex and is being integrated with other types of technology. Currently, a workflow may, at a single point in time, be integrated to interact with various other workflows, receive input from multiple users, or depend on the occurrence of pre-determined events. A single workflow may be only a small cog in a wheel within a large, complex system of moving parts for carrying out a business process, yet still play a vital role in the successful completion of the overall business process. Consequently, any errors within or disruptions to a single workflow may have a significant, negative impact on the overall process and/or its individual components.

A workflow is always prone to risks, especially when live (when it is receiving input from various users and other live processes and generating output). Currently, once a workflow is running, users of existing programmatic workflow technology are limited in their ability to regulate or manage a workflow's input or output actions and their underlying data. The actions, whether input or output, may be incorrect in its substance, form, relevancy, or source. Actions may also, while not being incorrect, be irregular and require user review and evaluation. Incorrect or irregular actions can have a negative impact on the running of a workflow. The effect of such actions can be significant when the actions are not detected and/or corrected. Additionally, due to relationships and integration with other workflows, processes, or technology, the incorrect or irregular action of a single workflow can also impede and prevent other workflows or processes from being carried correctly, if at all. Yet while such actions may inhibit some workflows or processes from being carried out, others may continue unimpeded, relying on incomplete or incorrect data and/or actions. This results in the potential for errors within other workflows and additional costs, delays, and user frustration.

Thus, what is needed are systems and methods for technology that allows users to create and customize workflow tolerances that define and set guidelines, such as parameters, limitations, and tolerances, for the expected values of a workflow's input and output actions. Such systems and methods, upon identifying values that fall out of determined guidelines, may: notify users of such values, trigger processes that pause or stop the workflow, and require user approval before resuming the paused/stopped workflow. Embodiments may comprise machine learning components that identify incorrect/irregular values without prior user designation. Such systems and methods should also improve communication technology between the networks and servers of separate parties relevant and/or dependent on successful execution of other workflows and processes; allowing for effective understanding, implementation, and engagement of workflows and processes across organizational boundaries.

SUMMARY

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to systems and methods for a workflow tolerance designer that: receives one or more tolerance instructions; generates a workflow tolerance based on the received tolerance instructions; integrates the workflow tolerance into a workflow, wherein the workflow comprises at least one workflow action capable of execution, wherein the at least one workflow action comprises at least one of: receiving data input, generating data output, and combinations thereof; performs evaluation of the workflow, wherein the evaluation of the workflow comprises comparison of the workflow tolerance to one or more workflow actions being executed and identification of a trigger, wherein the trigger comprises a value of the one or more executing workflow actions not complying with the workflow tolerance; determines if the evaluation of the workflow identifies the trigger; pauses the workflow upon determination of identification of the trigger; and generates and displays an approval workflow upon the pausing of the workflow.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various other embodiments all without departing from, or limiting, the scope herein.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE ILLUSTRATIVE EMBODIMENTS

Figure 1:
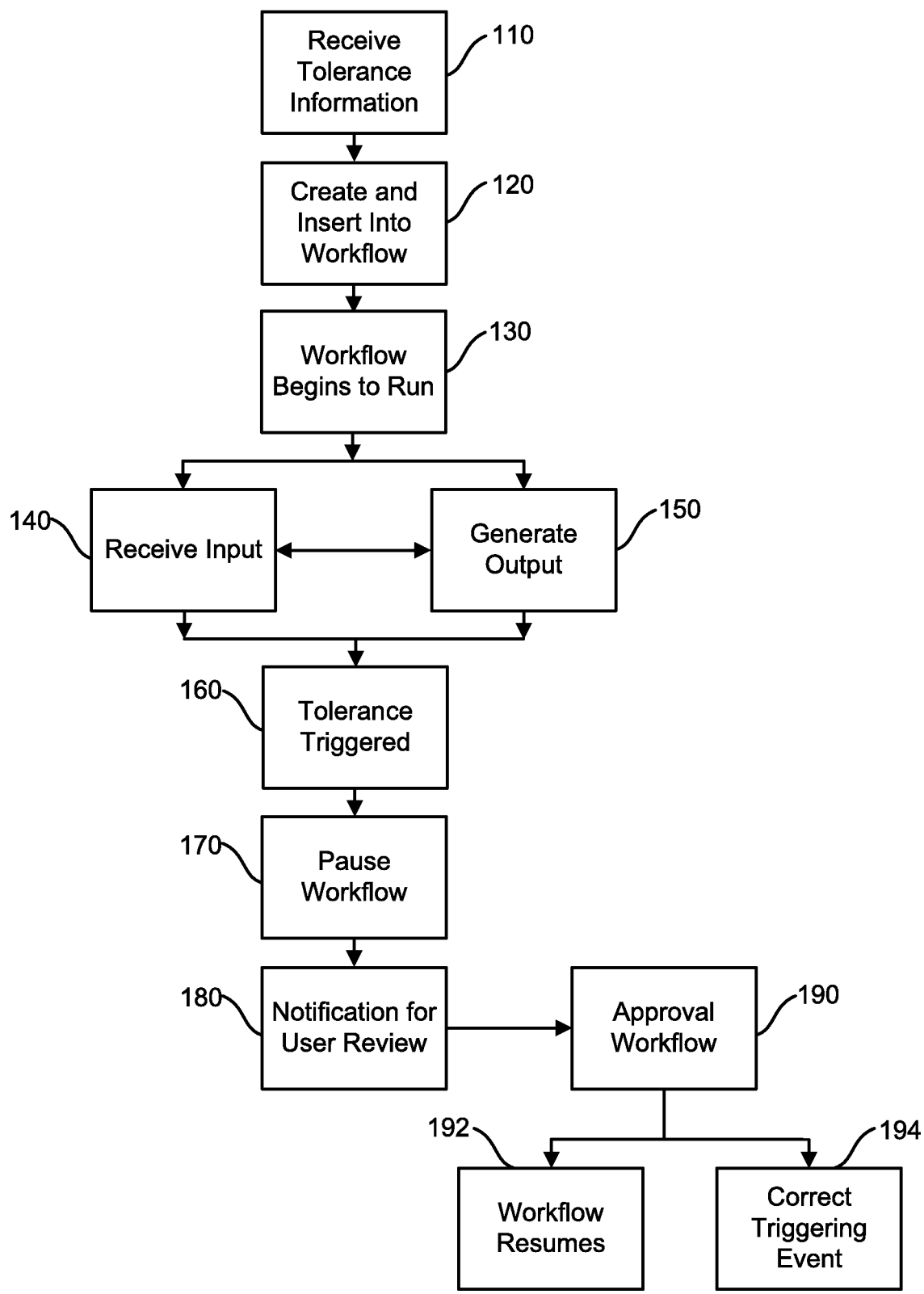
FIG. 1 is a functional flow diagram generally illustrating an embodiment of a method for the creation and use of workflow tolerances by a workflow tolerance designer.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

When designing a workflow, a user may want to monitor or control a workflow's input and output actions and data. For example, a user may want to know of and/or prevent the output of a date for an actionable item that is after a certain deadline. In another example, a user may wish to become aware of an input for a dollar amount that exceeds a certain amount or require manager approval before a document is deemed completed.

The use of tolerances within a workflow allow a workflow, and the data underlying its actions, to be monitored and controlled after it is live and running. Tolerances, as disclosed here, refer to any set of guidelines that define acceptable, unacceptable, and questionable actions or data and designate such accordingly. Embodiments comprise true tolerances—an allowable amount of variation of a specified value. Other embodiments comprise threshold values, such as a minimum threshold that must be met or a maximum threshold that cannot be exceeded. Embodiments may also comprise parameters, a defined range of values, or requirements tailored to the workflow, such as requiring a manager to approve an expense.

The basis for a tolerance may vary significantly. For example, tolerances may be based on governmental compliance requirements, historical data derived from prior occurrences of the workflow, or may be a one-time requirement set by a user or company.

The workflow tolerance designer ("designer") develops the boundaries of a tolerance by creating and implementing rules that define the tolerance's boundaries. The created rules are derived from instructions the designer receives from another source, such as a user. The created rules explicitly set forth the actions, data, or values that do not comport with the tolerance and cause the tolerance to be triggered.

The designer may also generate and provide options for placement of the tolerance when designing the workflow, such that tolerances may be placed at the beginning or end of a workflow, and at any point in between. In one embodiment, the building of a workflow tolerance may not require coding, but rather can be placed directly into a workflow when the workflow is designed.

The designer may comprise machine learning capabilities such that the designer is sufficiently intelligent to derive tolerances for expected values or actions of a workflow. In one embodiment, after a tolerance is created and its rules are implemented, the designer may analyze the data received and refine the original tolerance. For example, after a tolerance is designed that requires a final project to be due by a set date, the designer may recognize what steps must be fulfilled to meet the deadline. In recognizing such steps, the designer may determine additional deadlines for those steps and create tolerances that require those steps to be satisfied by the determined deadlines.

Other embodiments of machine learning capabilities may comprise a smart designer that collects data and detects a pattern or trend of values, actions, or input/outputs from previously executed workflows. In detecting such patterns or trends, the smart designer may automatically generate and incorporate a workflow tolerance into present or future workflows. These new workflow tolerances would function like other tolerances but would be the creation of the designer rather than a user. For example, a designer may detect irregular or abnormal values in a current workflow when compared to the recorded values of the previously executed workflows.

FIG. 1 is a functional flow diagram generally illustrating an embodiment of a method for the creation and use of workflow tolerances by a workflow tolerance designer. As shown in FIG. 1, a designer begins the creation and use of a tolerance by receiving 110 instructions that both set forth the boundaries of the tolerance and specify its location. Upon receiving 110 the instructions, the designer creates the tolerance, develops the boundaries of the tolerance, and inserts 120 it into a workflow prior to the workflow's commencement. As the workflow runs 130, it may receive input data 140 by action inputs and/or generate output data 150 by its action outputs. When the designer determines that the tolerance is triggered 160 by either the input 140 or output 150, the designer pauses 170 the workflow. The designer then provides the triggering event to a user to be addressed before any more actions of the workflow are carried out. And when triggered 160, the designer generates and displays a notification 180 for user review. The notification 180 may comprise the generation and integration of an approval workflow 190 into the workflow, wherein the approval workflow 190 may comprise options that allow a user to resume 192 the workflow and/or correct 194 the triggering event so that it falls within tolerance parameters.

Figure 2:
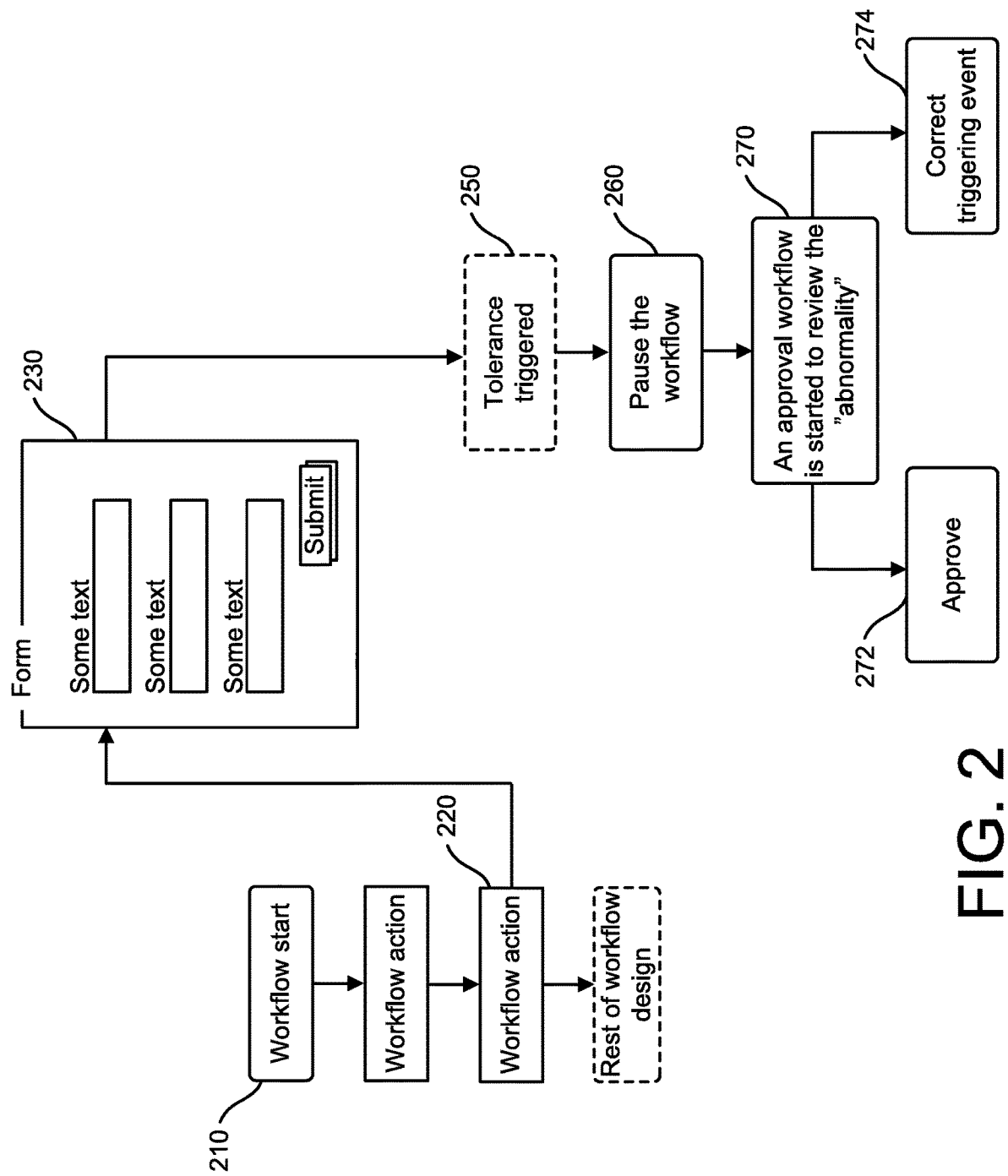
FIG. 2 is a functional block diagram generally illustrating embodiments of a method for the creation and use of workflow tolerances by a workflow tolerance designer.

FIG. 2 is a functional block diagram generally illustrating embodiments of a method for the creation and use of workflow tolerances by a workflow tolerance designer. FIG. 2 discloses an embodiment of a workflow 210 executing a workflow action 220, wherein the workflow action triggers 250 a tolerance previously created by the designer. Here, the triggering workflow action 220 may be the result of either the data inputted into the workflow action 220 or the output from the workflow action 220. Upon determining that the tolerance has been triggered 250, the designer pauses 260 the workflow, and generates and runs an approval workflow 270. The approval workflow 270 may comprise the option to approve 272 the workflow action and resume the workflow and/or the option to correct 274 the triggering event prior to resuming the workflow. FIG. 2 also discloses an embodiment of a form 230 within a workflow action 220, wherein a user fills out a form within the workflow action 220. The designer may recognize and determine that the form 230 has triggered 250 the tolerance pertaining to the workflow 210, resulting in the designer pausing 260 the workflow and generating and running an approval workflow 270.

Figure 3:
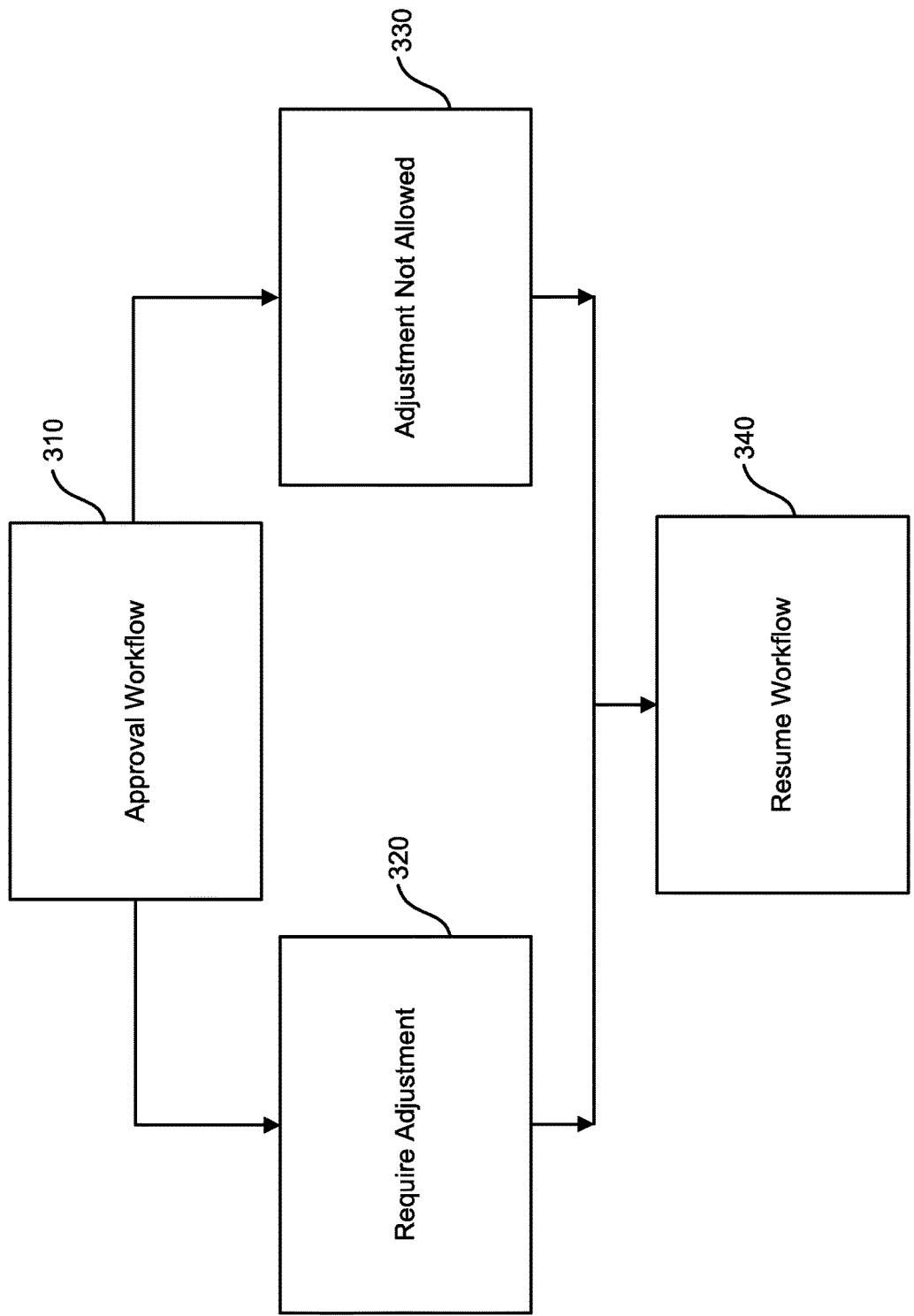
FIG. 3 is a functional flow diagram generally illustrating an embodiment of an approval workflow stemming from the use of a workflow tolerance.

FIG. 3 is a functional flow diagram generally illustrating an embodiment of an approval workflow stemming from the use of a workflow tolerance. An approval workflow is a workflow that is used to resolve the action that triggered the tolerance. An approval workflow may be generated by the designer when a tolerance is triggered 160 or when the notification 180 for user review is generated by the designer. The designer may display it after the workflow is paused 170 or in conjunction with the notification 180. An approval workflow allows a user to review the triggering action and provides recourses to review, correct, or approve the triggering action. In one embodiment, an approval workflow 310 may comprise a recourse that requires 320 an adjustment to be made before the paused workflow resumes. In another embodiment, an approval workflow 310 may not allow 330 an adjustment to be made. Upon a recourse being taken, the approval workflow 310 may display an option to resume 340 the paused workflow.

In one embodiment, upon a tolerance being triggered and the workflow paused, the generated approval workflow may require review and/or approval by a specific user. For example, the approval workflow may require approval from only one specific user or any number of users that pertain to a specific group/entity. However, an approval workflow is not required to be reviewed and approved by only specified users.

Figure 4:
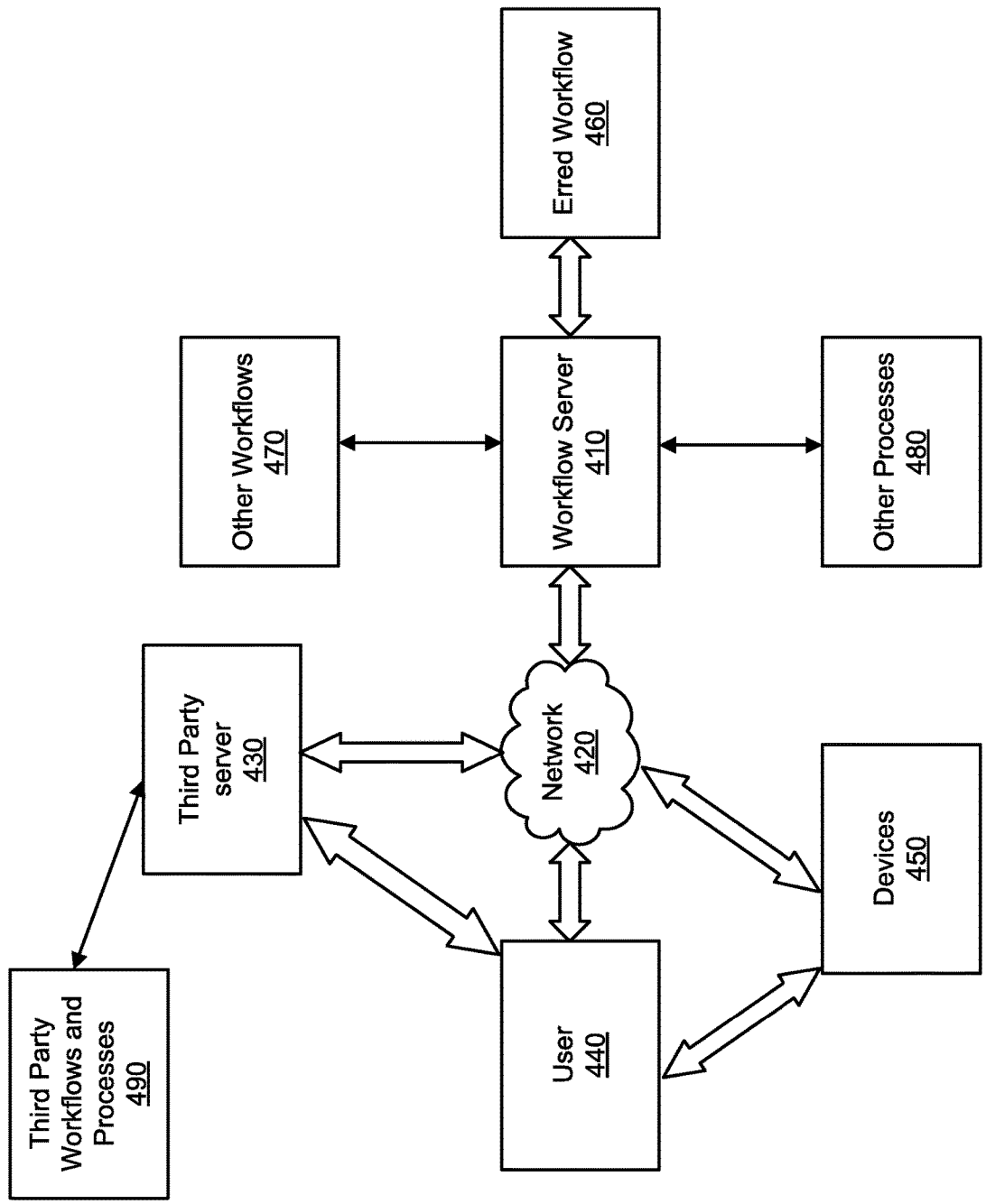
FIG. 4 is a functional block diagram generally illustrating an embodiment of a network system for a workflow tolerance designer system.

FIG. 4 is a functional block diagram generally illustrating an embodiment of a network system for a workflow tolerance designer system. A network system, as shown in FIG. 4, may comprise a workflow server 410 accessible over a local area network or a wide area network 420, such as the Internet. In one embodiment, the designer may reside within the workflow server 410. In another embodiment, the designer may reside in an electronic device 450 or third-party server 430. The designer, whether residing in the workflow server 410 or other location, may enable third party servers 430, users 440, and electronic devices 450 to connect to a paused workflow 460 and/or a workflow tolerance within the workflow 460. The designer's location may also host additional workflows 470 and additional high-level processes 480, each accessible to their respective owners and other users.

In accordance with the preferred embodiment, the designer is remotely accessible by a number of user computing devices 450, including for example, laptops, smartphones, computers, tablets, and other computing devices that are able to access the local area network or a wide area network where the designer resides. In normal operation, each user electronic device 450 connects with the designer to interact with the paused workflow 460, the workflow tolerances incorporated within the workflow 460, and the additional workflows 470 and processes 480. As is also known, each additional process 470 or workflow 480 may employ a number of connectors to interact with third party 430 servers and their data, services, or applications, such as a third-party workflow or process 490.

Figure 5:
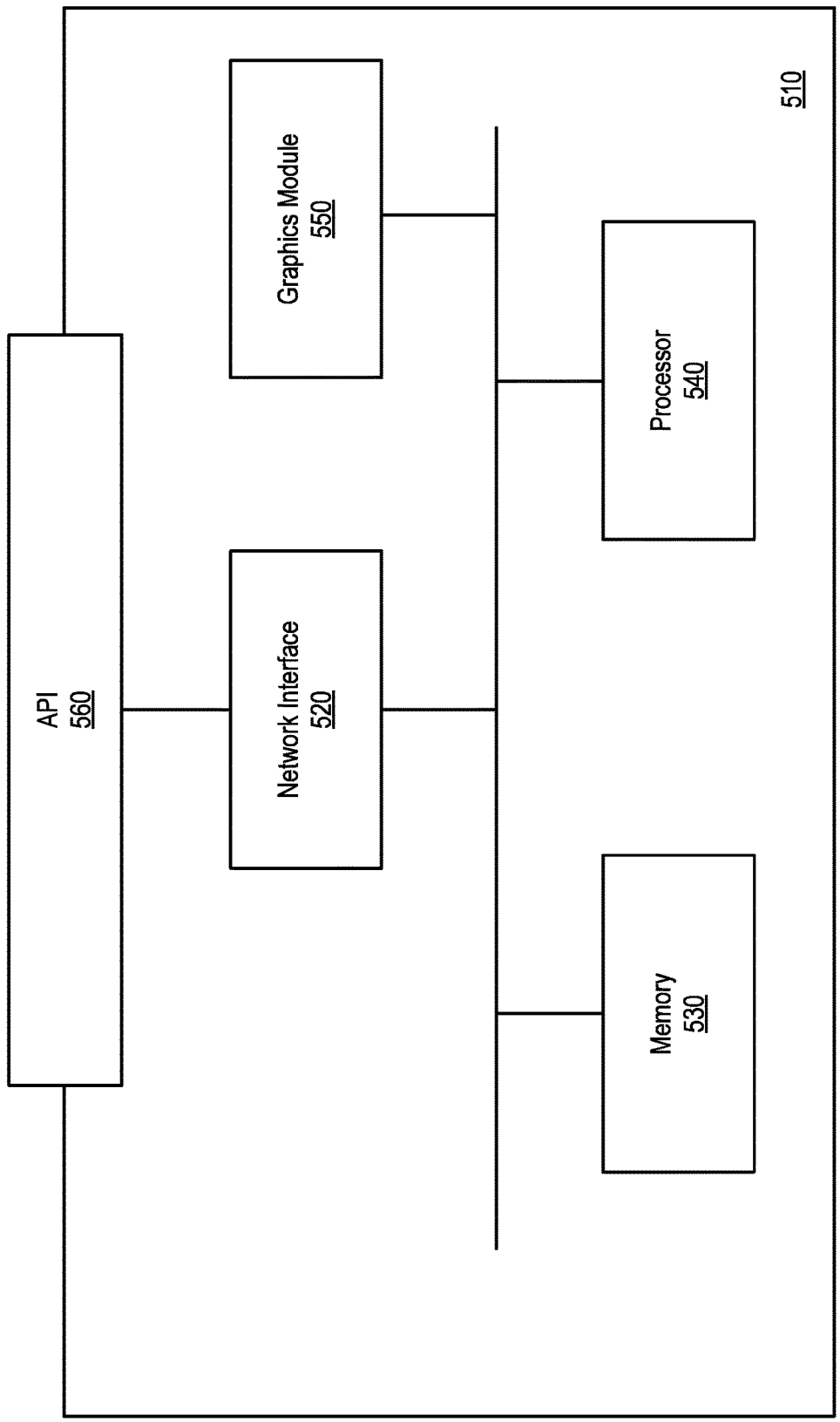
FIG. 5 is a functional block diagram generally illustrating an embodiment of an electronic device system for a workflow tolerance designer system.

FIG. 5 is a functional block diagram generally illustrating an embodiment of an electronic device system for a workflow tolerance designer system. The designer may reside within the electronic device 510. The electronic device 510 may be coupled to a workflow server 410 via a network interface 520. The electronic device 510 generally comprises a memory 530, a processor 540, a graphics module 550, and an application programming interface 560. The electronic device 510 is not limited to any particular configuration or system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order; it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed is:

1. A system for generating programmatic workflow tolerances, comprising:
   a computer system having a hardware processor and a physical memory using executable instructions that, as a result of being executed by the hardware processor, cause the computer system to:
   receive, by the hardware processor, one or more tolerance instructions;
   generate, by the hardware processor, a programmatic workflow tolerance based on the received one or more tolerance instructions;
   integrate, by the hardware processor, the programmatic workflow tolerance into a programmatic workflow, wherein the programmatic workflow comprises at least one workflow action capable of execution, wherein the at least one workflow action comprises at least one of: receiving data input, generating data output, and combinations thereof;
   perform, by the hardware processor, evaluation of the programmatic workflow, wherein the evaluation of the programmatic workflow comprises comparison of the programmatic workflow tolerance to one or more workflow actions being executed and identification of a trigger, wherein the trigger comprises a value of the one or more executing workflow actions not complying with the programmatic workflow tolerance;
   determine, by the hardware processor, if the evaluation of the programmatic workflow identifies the trigger;
   pause, by the hardware processor, the programmatic workflow upon determination of identification of the trigger;
   generate and display, by the hardware processor, an approval workflow upon the pausing of the programmatic workflow;
   iteratively detect, by the hardware processor, a pattern of previous values of one or more previously executed workflow actions; and
   generate, by the hardware processor, an automatic workflow tolerance upon the detection of the pattern of previous values of the one or more previously executed workflow actions.

2. The system of claim 1, wherein the data input comprises at least one of: a workflow start input, a workflow action input, and combinations thereof.

3. The system of claim 1, wherein the data output comprises a workflow action output.

4. The system of claim 1, wherein the tolerance instructions comprises one or more values derived from historical data generated by the programmatic workflow.

5. The system of claim 1, wherein the tolerance instructions comprises one or more values designated as threshold values.

6. The system of claim 1, wherein the approval workflow comprises a requirement of adjusting one or more values of the workflow actions.

7. The system of claim 1, wherein the approval workflow comprises a prevention of adjusting one or more values of the workflow actions.

8. A method for generating workflow tolerances via one or more processors, comprising:
   receiving one or more tolerance instructions;
   generating a programmatic workflow tolerance based on the received tolerance instructions;
   integrating the programmatic workflow tolerance into a programmatic workflow, wherein the programmatic workflow comprises at least one workflow action capable of execution, wherein the at least one workflow action comprises at least one of: receiving data input, generating data output, and combinations thereof;
   performing evaluation of the programmatic workflow, wherein the evaluation of the programmatic workflow comprises comparing the programmatic workflow tolerance to one or more workflow actions being executed and identifying a trigger, wherein the trigger comprises a value of the one or more executing workflow actions not complying with the programmatic workflow tolerance;
   determining if the evaluation of the programmatic workflow identifies the trigger;
   pausing the programmatic workflow upon determination of identification of the trigger;
   generating and displaying an approval workflow upon the pausing of the programmatic workflow;
   iteratively generating an automatic programmatic workflow tolerance; and
   continually detecting a pattern of previous values of previously executed workflow actions, wherein the iteratively generating an automatic programmatic workflow tolerance is based at least in part on the continually detecting the pattern of previous values of previously executed workflow actions.

9. The method of claim 8, wherein the data input comprises at least one of: a workflow start input, a workflow action input, and combinations thereof.

10. The method of claim 8, wherein the data output comprises a workflow action output.

11. The method of claim 8, wherein the tolerance instructions comprises one or more values derived from historical data generated by the programmatic workflow.

12. The method of claim 8, wherein the tolerance instructions comprises one or more values designated as threshold values.

13. The method of claim 8, wherein the approval workflow comprises a requirement of adjusting one or more values of the workflow actions.

14. The method of claim 8, wherein the approval workflow comprises a prevention of adjusting one or more values of the workflow actions.

15. The method of claim 8, wherein the approval workflow is based at least in part on a user input.

16. A system for generating workflow tolerances, comprising:
a computer system having a hardware processor and a physical memory using executable instructions that, as a result of being executed by the hardware processor, cause the computer system to:
receive, by the hardware processor, one or more tolerance instructions;
generate, by the hardware processor, a workflow tolerance based on the received one or more tolerance instructions;
integrate, by the hardware processor, the workflow tolerance into a workflow, wherein the workflow comprises at least one workflow action capable of execution, wherein the at least one workflow action comprises at least one of: receiving data input, generating data output, and combinations thereof;
perform, by the hardware processor, evaluation of the workflow, wherein the evaluation of the workflow comprises comparison of the workflow tolerance to one or more workflow actions being executed and identification of a trigger, wherein the trigger comprises a value of the one or more executing workflow actions not complying with the workflow tolerance;
determine, by the hardware processor, if the evaluation of the workflow identifies the trigger;
pause, by the hardware processor, the workflow upon determination of identification of the trigger;
generate and display, by the hardware processor, an approval workflow upon the pausing of the workflow;
continually detect, by the hardware processor, a pattern of previous values of one or more previously executed workflow actions; and
iteratively generate, by the hardware processor, an automatic workflow tolerance upon the detection of the pattern of previous values of the one or more previously executed workflow actions.

* * * * *